Figure 11:
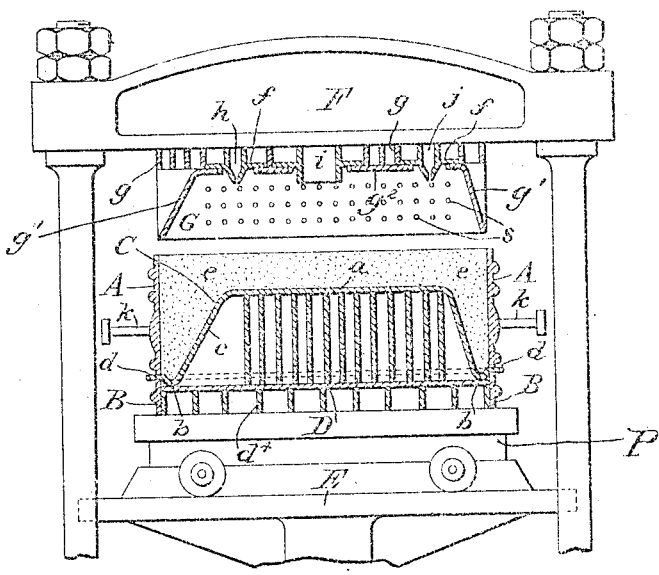

No. 892,144.
PATENTED JUNE 30, 1908.
P. DUPONT.
MOLDING BATH TUBS AND OTHER LARGE ARTICLES.
APPLICATION FILED JUNE 26, 1906.
4 SHEETS—SHEET 1.
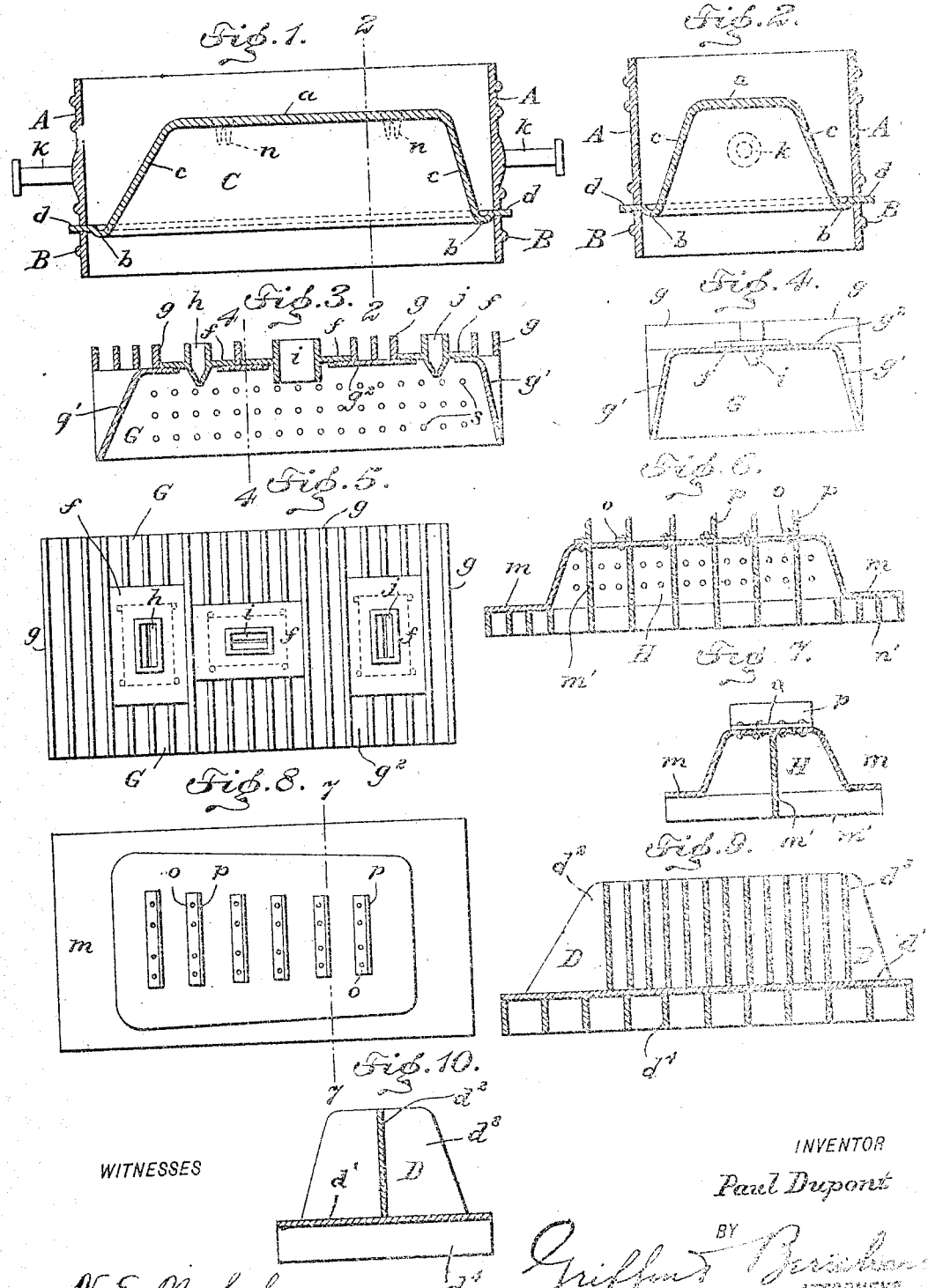
WITNESSES
V. E. Nichols
R. A. Mooney
INVENTOR
Paul Dupont
BY
Griffin Burchard
ATTORNEYS No. 892,144.

PATENTED JUNE 30, 1908.

P. DUPONT.
MOLDING BATH TUBS AND OTHER LARGE ARTICLES.
APPLICATION FILED JUNE 28, 1906.

4 SHEETS—SHEET 2.

WITNESSES
V. E. Nichols
R. A. Mooney

INVENTOR
Paul Dupont
BY
Griffin & Bernhard
ATTORNEYS

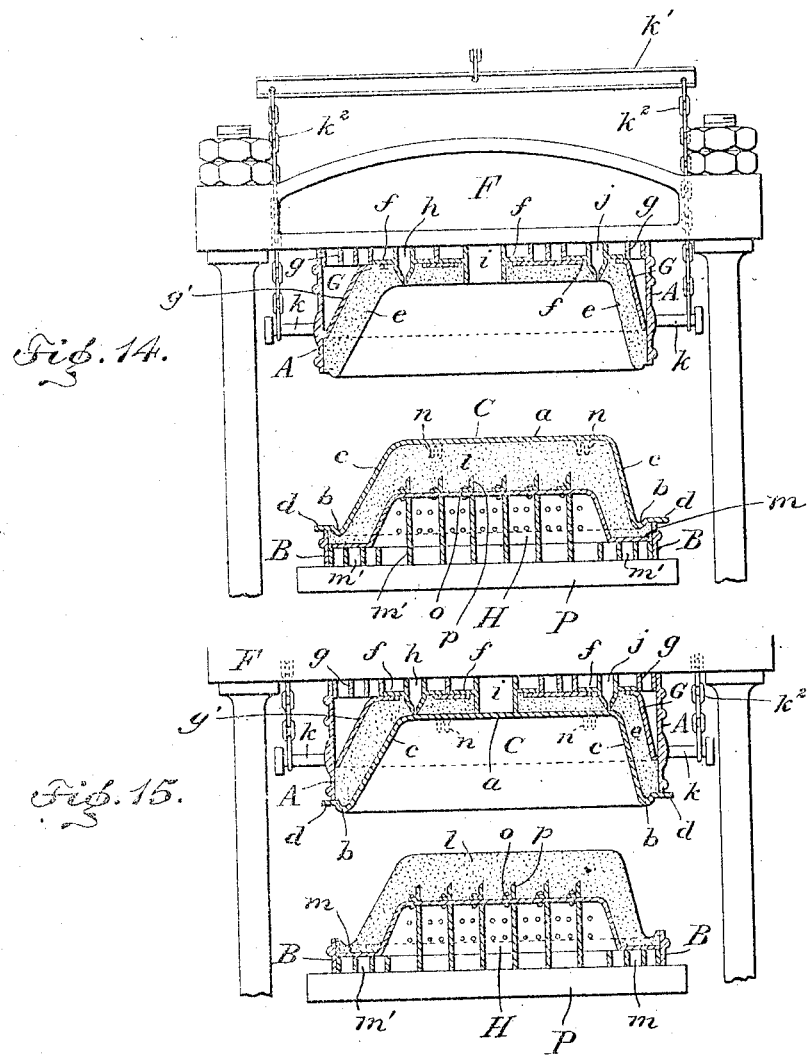

UNITED STATES PATENT OFFICE.

PAUL DUPONT, OF LE CATEAU, FRANCE.

MOLDING BATH-TUBS AND OTHER LARGE ARTICLES.

No. 892,144.  Specification of Letters Patent.  Patented June 30, 1908.

Continuation of application Serial No. 187,267, filed December 31, 1903. This application filed June 28, 1906.
Serial No. 323,901.

*To all whom it may concern:*

Be it known that I, PAUL DUPONT, a citizen of the Republic of France, residing at Le Cateau, (Nord,) in the Republic of France, have made a certain new and useful Invention Appertaining to Molding Bath-Tubs and other Large Articles, of which the following is a specification.

Heretofore, so far as I am aware, no method or apparatus has been devised for the successful or practical mechanical molding of large hollow articles, such as bath tubs, but my invention enables this result to be accomplished.

In molding such an article as a bath tub, where the walls are very thin, great skill and care are essential in the making of the mold. The space to be occupied by the cast metal is so thin in cross-section, and so extensive in area, that the respective parts of the mold in the cope and drag must be made with the greatest accuracy. Furthermore, the molded surfaces must be uniformly dense and firm, in order that no parts thereof will yield or sag during the pouring operation, and thereby produce an article having walls of uniform thickness. In order to mold these surfaces accurately, and with the required density, I provide means for the uniform distribution of the sand over the face of the pattern, preliminarily to compressing said sand against the pattern, and make provision, also, for the proper alinement of the compressor and flask, and for assuring an accurate vertical travel of the flask towards the compressor, or vice versa, preferably a movement of said flask toward the compressor while the latter occupies a fixed position.

For the purpose of retaining the body of the sand in a fixed position after molding, and during the pouring, I not only employ great pressure in molding both the drag and cope, but I allow the compressors to remain in the flask until after the metal has been poured into the mold.

During the operation of molding the cope, I support the pattern by a reinforcing frame in order to prevent said pattern from yielding or breaking under the great pressure to which it is subjected.

My invention dispenses with the necessity of employing skilled labor, and this advantage, coupled with the fact that the operations of molding can be quickly and easily performed, enable me to make articles of the character under consideration very economically. Furthermore, bath tubs can be made in accordance with my invention, having walls considerably thinner than it was possible to make them heretofore, even with the employment of skilled labor.

Figure 12:
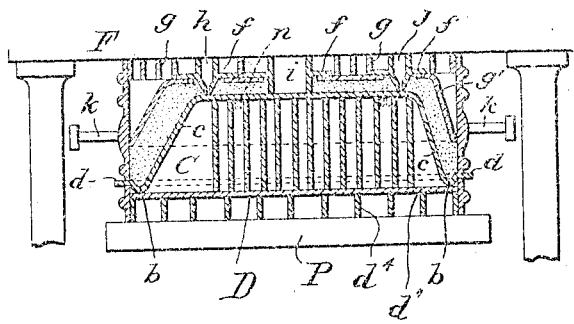
Figure 13:
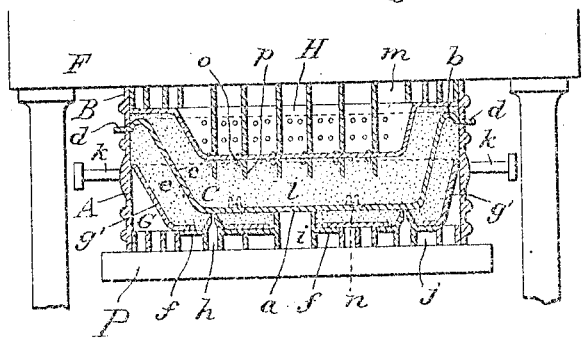
Figure 16:
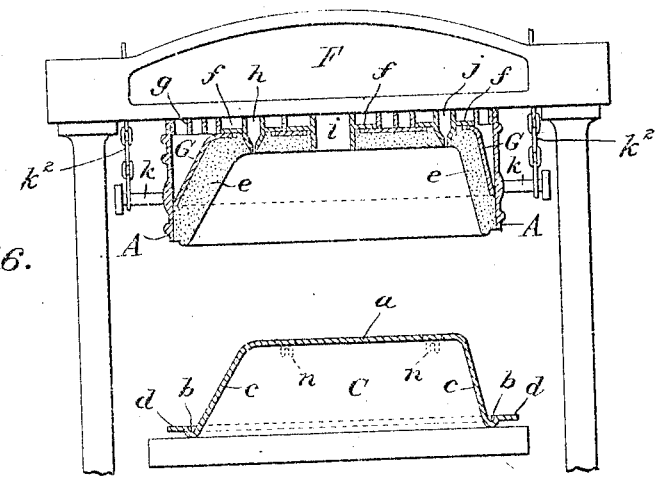
Figure 17:
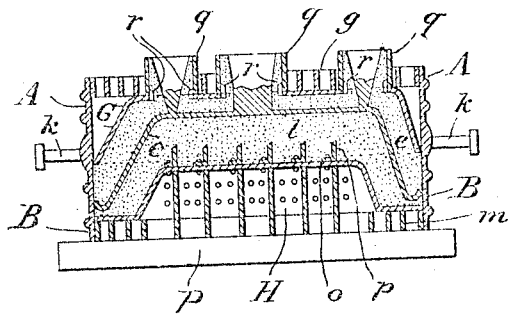
Figure 18:

The invention will now be described more in detail, and other advantages thereof pointed out, in conjunction with the accompanying drawings wherein, Figure 1 is a vertical longitudinal section of a two-part flask having a pattern between the two parts thereof; Fig. 2 is a cross-section on line 2—2 of Fig. 1; Figs. 3, 4 and 5 are a longitudinal section, a transverse section, and a plan, respectively, of a rammer, or compressor, for compressing sand against the outer side of a pattern, the said rammer having movable gate formers fitted thereto; Figs. 6, 7 and 8 are a longitudinal section, a transverse section on the line 7—7 of Fig. 8, and a plan, respectively, of another rammer designed to ram or compress the sand against the inner side of a pattern; Figs. 9 and 10 are a longitudinal section, and a transverse section, respectively, of a reinforcing or stiffening frame, for the purpose of enabling the pattern to resist the high pressure incident to the compression of the sand against the outer side of the pattern; Fig. 11 is a general view showing the parts assembled and mounted within a press, for compressing the sand against the outer side of the pattern, prior to the operation of compressing; Fig. 12 is a similar view to that of Fig. 11, showing the relation of the parts after the compression of the sand against the outer side of the pattern; Fig. 13 shows the flask and pattern in an inverted position from that shown in Figs. 11 and 12, the parts being in the positions which they occupy after the sand has been compressed against the inner side of the pattern; Fig. 14 is a vertical section, partly in elevation, showing the assembled drag and pattern, lowered away or separated from the cope, said cope being suspended from the press head; Fig. 15 is a view similar to that shown in Fig. 14, but with the pattern and cope assembled; Fig. 16 is a vertical section, partly in elevation, showing the pattern as separated or withdrawn from the cope; Fig. 17 is a vertical section showing the position of the several parts of the apparatus after the pouring operation; and Fig. 18 is a plan view of the central gate frame shown in Fig. 17.

In my invention I employ a two-part flask, consisting of the cope A and drag B.

C is a pattern, as illustrated a pattern of a bath tub, $a$ being the bottom, $c$ the inclined sides, $b$ the curved top edge, and $d$ the flanges thereof. The relative sizes of the flask and pattern are such that the flange $d$, may fit between the adjacent edges of the cope and drag. The parts of the flask and pattern may be locked together by any suitable fastening or locking devices.

For compressing the sand against the outside of the pattern in molding the same within the cope, I employ a compressor or rammer G, the inner face of which corresponds in profile to the outer face of the pattern, the side walls, $g'$ $g'$, of said compressor being inclined at an angle to the vertical side walls of the cope. This shape or form of compressor enables the same to enter the cope and preliminarily distribute the sand uniformly over the face of the pattern prior to compressing it thereon; a further travel or movement of said compressor into the cope serving to mold or compress the sand evenly and uniformly upon the outer side of the pattern.

The top or upper surface, $g^2$, of the compressor is provided with openings, preferably three in number, through which extend gate formers, $h$, $i$, $j$, the latter being provided with flanges $f$, adapted to rest on the top $g^2$, whereby said gate formers are removably supported in position on the compressor. If desirable, the openings for the gate formers may be made of such size as to permit an adjustment of the gate formers $h$ and $j$, sidewise of the compressor, and of the gate former $i$, lengthwise thereof, as shown in Figs. 3 and 5. The gate formers $h$, $i$ and $j$, are hollow and made, preferably, from steel, the gate formers $h$ and $j$, being tapering or wedge-shaped at their lower ends, so as to facilitate the forming of the gates. After the molding operation, but prior to pouring, the gate formers $h$ and $j$ are replaced by gate frames $q$, which are held in position by pins $r$, the function of which gate frames will be more fully set out in connection with the description of the operation of the apparatus.

The top of the compressor is strengthened or reinforced by ribs $g$ on the exterior surface thereof, and said ribs are preferably made of such height as to bring the tops thereof in the same plane as the tops of the gate formers, thereby permitting the said ribs and gate formers to engage the head of the press when the compressor is held in place against the head of the press.

To prevent the pattern from collapsing or bending during the application of pressure thereto to compress the sand against the outer side of said pattern, I employ a supporting or reinforcing frame D, which is placed in position to engage with the inner side of the pattern. The profile of the outer surface of this frame corresponds, preferably, with that of the inner side of the pattern, the said frame being composed, preferably, of a base board $d'$, the longitudinal rib $d^2$, the transverse spaced ribs $d^3$, extending upwardly from said base board, and the transverse spaced ribs $d^4$, extending downwardly therefrom.

In compressing sand against the inner side of the pattern, I employ a second compressor H, see Figs. 6, 7 and 8, the exterior surface of which has a profile corresponding to that of the inner side of the pattern. The said compressor is provided with a marginal flange $m$, and from the under or inner side of said compressor, which is made hollow, and likewise from the flange $m$, extend strengthening ribs $m'$. The outer face of the compressor is provided with ribs or strips $o$, made from angle iron or steel, the edges of which are beveled or sharpened as shown by $p$. When the pattern is withdrawn from the drag, subsequent to the operation of compressing the sand against the inner side of said pattern, these flanges, $o$, remain in the sand and assist in retaining it on the compressor. The length and width of the base $m$ of the compressor H, are the same as the inner dimensions of the frame D, and the height of said compressor is half the height of the frame D, in order that said compressor may fit accurately within the space in the drag B, occupied, previously, by said frame.

The cope A is provided with trunnions $k$ which enable said cope to be drawn upward against the head F of the press, by means of a movable beam $k'$, to which are attached chains $k^2$, extending from the beam to said trunnions.

In order to provide means for attaching feet or other supports to the bath tub, lugs or projections $n$, are removably secured to the outer face or side of the pattern, for the purpose of forming suitably shaped pockets or cavities in the sand during the operation of molding the outer side of the pattern. After this operation the said lugs or projections are detached from the pattern and withdrawn from the sand, and replaced by cores of corresponding shape. The lugs, and corresponding cores are so shaped that after the cores are placed in position and the pouring operation is completed, the pockets or cavities formed by said cores on the outer surface of the tub permit the ready attachment of the feet or other supports.

The compressors G and H are preferably made of metal, such as sheet iron, and in order to permit the ready escape of air or gases evolved during the casting or pouring operation the sides of said compressors are perforated, as indicated by s', see Fig. 3, the necessary vents being produced in the sand by molders' needles, as is customary in the art.

In the practical employment of the apparatus above described, I utilize some form of press, preferably of the hydraulic type, for producing the necessary compressions of the sand in the molding of the pattern. The preferred form of press is illustrated in Figs. 11, 14, 15, and 16, wherein the platen or movable member of the press is designated as F. The structure of the press is set out more in detail, in connection with the description of the operation of my new molding apparatus.

For convenience in manipulating the several parts of my molding apparatus, I employ a carriage or truck P, mounted on wheels, and which will also be further referred to hereafter.

The construction of the apparatus having now been set forth, its operation will be readily understood from the following description thereof with reference to the molding of a bath tub.

In the operation of molding a bath tub, the pattern is first affixed in position between the two parts of the flask, the main body of the pattern extending upwardly into the cope, as clearly appears in Figs. 1 and 2; the supporting or reinforcing frame D is then placed on the carriage or truck P, and the pattern and assembled flask placed over it, whereupon the truck is wheeled onto the platen of the press, (see Fig. 11); the compressor G, upon which the gate formers, h, i, j, have been placed in position, is then secured in a fixed position against the head F of the press, (see Fig. 11); this having been done the platen of the press is raised in order that the truck may be so positioned on the platen as to bring the pattern in exact alinement, or proper relative position, with reference to the compressor G; the platen carrying with it the assembled parts A, B, C, is then lowered, whereupon the cope is filled with sand, and then leveled off, as shown in Fig. 11; the platen is again raised in order that the cope and the compressor may be brought into coöperative relation; when the compressor enters the cope, its first function is to distribute the sand uniformly over the outer face of the pattern, without producing any material pressure of the sand in a vertical direction or against the pattern, this result being accomplished by the particular shape or contour of the inner side walls of the compressor, these walls being so inclined, with reference to the vertical sides of the cope, as to produce a compressor, the interior of which is, practically, of a frusto-conical shape; the inclined walls of the compressor act as a wedge in entering the sand, and thereby displace the sand laterally from the side walls of the cope, and distribute it uniformly over the outer face of the pattern preliminarily to producing any substantial vertical pressure on said pattern; this operation of distributing the sand will have been completed when the compressor has entered the cope a distance equal to about two-thirds the vertical height of said compressor, the further movement of the flask with reference to the compressor resulting in a uniform compression of the sand over the entire outer face of the pattern. (Fig. 12). While the compressor G enters the cope along a vertical path, yet by reason of its shape it acts in a manner similar to a wedge, when used for splitting wood, in that it produces a lateral or oblique pressure of the sand against the pattern. The first or long part of the stroke of the compressor operates, therefore, to produce only an even or uniform distribution of the sand, and in the latter part, or small part, of the stroke to compress said sand with equal force or pressure throughout the entire outer face of the pattern.

In view of the facts that a bath tub is a very large article, and that the walls thereof must be made relatively thin, it is very essential, in order to mold these walls of uniform thickness, that the great pressure necessary to accomplish this result be uniformly distributed over the face of the pattern. In order to accomplish this function, it is necessary to first distribute the sand so that it is of practically a uniform depth over all parts of the pattern; otherwise, greater pressure will be applied to certain parts of the pattern than to others, thereby leaving the walls of the mold less firmly compressed than other parts thereof, resulting in an article the walls of which are of ununiform thickness owing to the tendency of the walls of the mold to yield to the pressure of the metal at the places where said walls are not firmly compressed.

Another feature of my apparatus coöperating in the production of a perfect mold is the fact that the outer walls of the compressor are so proportioned as to fit the interior walls of the cope snugly, whereby said compressor, which is fixed in position, accurately guides the movement of the cope in a vertical path. The shape of the compressor therefore, is a most important feature in my molding apparatus.

The outer face of the pattern having been molded as described, the assembled flask and compressor, the compressor having been detached from the head of the press, are now inverted, and for convenience and expedition in carrying out this operation, the flask and compressor may, if desired, be secured together in the relative positions which they occupy after the compressing operation. In practically carrying out this step of inverting the flask and compressor, the flask may be suspended from the beam $k'$, through the medium of the chains $k^2$, connecting with the trunnions $k$ of the cope, the truck being momentarily lowered; the truck is then restored to position and the chains detached from the trunnions, whereupon the platen of the press, carrying the truck and inverted flask is lowered away from the press head. The reinforcing frame D is then withdrawn from its supporting position relative to the pattern. The truck, carrying the thus assembled parts, is now wheeled off the press. At this stage, or any suitable one, in the operation of the apparatus, the gate formers $h$, $i$, $j$, are removed from the compressor G, and pouring openings formed in the positions occupied by $h$ and $j$, by means of the pouring gates $q$, as is usual in the art, and as illustrated in Fig. 17, the central opening $i$, serving as the main vent during the casting operation.

The foregoing operations complete the molding of the outer face of the pattern, the molding surface thus formed serving as the matrix for the bath tub. In molding the inner face of the pattern, the compressor H is wheeled on a truck upon the platen E, which latter is then raised to bring said compressor H against the head F of the press, whereupon said compressor is fixedly secured in position on said head; the platen is then lowered, and after wheeling the empty truck thereoff, the truck P, carrying the inverted flask and pattern, is again run onto the platen, whereupon the latter is raised in order to bring it into proper alinement with the compressor H, in the same manner as previously described in connection with the compressor G; the platen with the flask and pattern are now lowered, and the drag filled with sand which is leveled off even with the upper edge of said drag; the platen and flask are again raised to bring said flask and compressor H into coöperative relation, (see Fig. 13) the flask approaching the compressor to the extent necessary to produce the required compression of the sand, after distributing the same, on the inner face of the pattern. It will be observed that during this second compressing operation, the compressor G, and the body of sand which has been molded against the outer surface of the pattern, remain in position in the flask, (Fig. 13), thereby serving as a backing or support for the pattern during the operation of molding the inner face of the pattern or the surface forming the inner walls of the bath tub. For this reason, it is unnecessary to employ such a supporting frame in forming that part of the mold corresponding to the inner face of the pattern as was employed in forming that part of the mold corresponding to the outer face of said pattern. The flask and the compressor H, the compressor having been detached from the head of the press, are now inverted in the same manner as previously described in connection with the compressor G, after which inversion the parts of the flask occupy their normal positions, the cope A being above the drag B, the flask being suspended from the chains in a manner similar to that hereinbefore described in molding the cope; the platen is now raised to bring it just beneath the flask, whereupon the devices which serve to lock the cope and drag are removed; the flange of the pattern, or that part of the pattern which extends between the cope and drag and exterior walls thereof, is now "rapped" for the purpose of loosening or freeing the outer side of the pattern from the sand in the cope, whereupon the platen, carrying the drag and pattern, is lowered; (see Fig. 14); the pattern is again "rapped", to free it from the sand in the drag, whereupon the platen, carrying the drag and the pattern, is again raised to permit the flange of the pattern to be secured to the cope; the platen, supporting the truck and drag, is now lowered (see Fig. 15), and the truck and drag wheeled away; an empty truck is now run onto the platen, whereupon the latter is elevated, the pattern detached from the cope and deposited on the truck (see Fig. 16), which truck and pattern are then removed from the press, leaving the cope suspended in the press; the truck carrying the drag is now run onto the platen of the press and the platen elevated so that the cope and the drag may be locked together without the intervention of the pattern.

The parts having been assembled as described, and removed to the casting floor, with the matrix or outer face of the pattern molded in the cope, and the patrix or inner face of the pattern molded in the drag, the cope and drag being secured together, the former having therein the compressor G, and the latter the compressor H, and the gate frames $q$ properly positioned in the compressor G, as previously described, the mold is now in readiness for pouring. The pouring operation having been completed, the several parts of the apparatus, with the cast bath tub, occupy the relative position shown in Fig. 17. The parts of the mold may then be separated, the casting removed, and treated in the manner as is usual with such articles.

It will be understood that a proper registration or alinement of each part of the flask with its corresponding compressor or rammer may be secured in any well known manner, such as by applying marks upon any two corresponding parts, such as the compressor G, and the cope A, or the compressor H and the drag B, when either pair of said parts have once been correctly alined with relation to each other.

In practice I have found it desirable to compress the sand, in each part of the flask, to about one half its normal or original volume. For this purpose, the required dimensions of the dome-shaped part, or the frusto-conical part, of the compressor H, which is to form the interior portion of the bath tub, may be obtained by multiplying the dimensions of the sides of the bath tub by 0.795 or $3\sqrt{0.5}$. By multiplying the three dimensions representing the volume of any bath tub by 0.795 a volume reduced by half is obtained.

As previously pointed out, skilled labor is not required in practicing my invention, and this is due to the facts, mainly, that the sand is first uniformly distributed over the pattern in the flask, and then compressed to such a degree thereon, both of said operations being performed automatically and with precision, that the surfaces of the resulting mold are perfect and permanent, thereby dispensing with one of the most difficult and delicate operations in hand molding; namely, the "slicking" or truing up of the surfaces of the mold after removal of the pattern. Furthermore, by my apparatus and method of procedure, I employ only about one half the quantity of sand ordinarily employed in molding large articles of the character herein described.

It will be understood that slight changes may be made in the apparatus and procedure as described, without departing from the spirit or substance of my invention, the foregoing description of my invention embodying, merely, what I now consider as the best method of practicing the same.

This application is a continuation of, and substitute application for, a prior application filed by me on December 31, 1903, Serial No. 187,267, and I herewith desire to have it understood that I do not relinquish any of my rights as determined by said prior application.

Having thus described my invention, what I claim as new, and desire to secure by Letters Patent is:—

1. In an apparatus of the class described, a flask, a pattern, a hollow compressor coöperating with the pattern and the flask, the interior of said hollow compressor tapering from its base upward and forming a pressure surface which is substantially frusto-conical in shape, and the base of which frusto-conical surface is adapted to first enter the flask for the purpose of uniformly distributing sand over the face of the pattern prior to compressing the sand against said pattern.

2. In an apparatus of the class described, a flask, a pattern, and a hollow compressor adapted to fit snugly within said flask, the said hollow compressor having a substantially flat interior upper surface, and having straight inclined walls extending from said upper surface at an angle to the sides of the flask, whereby the compressor entering the flask will operate to uniformly distribute sand over the face of the pattern prior to compressing the sand against said pattern.

3. In an apparatus of the class described, a two-part flask, a hollow compressor having interior peripheral walls inclined at an angle to the walls of one of the parts of said flask, and a second compressor, disconnected from the first, having external peripheral pressure surfaces inclined at an angle to the walls of the other part of said flask, whereby each compressor is adapted to operate to uniformly distribute sand over the respective faces of the pattern prior to compressing sand against said pattern.

4. In an apparatus of the class described, a two-part flask, and two disconnected compressors, adapted for individual or conjoint use, one of said compressors coöperating with the cope of said flask, and the other compressor coöperating with the drag of said flask, whereby one compressor is adapted to remain in the flask for supporting the sand, and to assist in keeping a pattern from bending during the operation of the other compressor.

5. In an apparatus of the class described, a two-part flask, a pattern positioned therein, a compressor adapted to distribute the sand over one face of the pattern and to subsequently compress the sand against the pattern, and which compressor is adapted to remain in the flask until the casting operation is completed, and a second compressor separate from the other compressor for compressing sand against the other face of said pattern, which second compressor is adapted, also, to remain in the flask until the casting operation is completed.

6. In an apparatus of the class described, a flask, a pattern positioned therein, a hollow compressor, the interior contour of which is substantially frusto-conical, whereby prior to the compressing operation of said compressor the sand is uniformly distributed over the face of the pattern, and a second and corresponding compressor, the exterior contour of which is also substantially frusto-conical.

7. In an apparatus of the class described, a flask, a hollow pattern having thin walls positioned in said flask, a compressor having a pressure surface of a contour corresponding in shape to one side of said pattern, and adapted to distribute the sand over the pattern prior to compressing the sand against said pattern, and a second compressor, separate from said other compressor, having a pressure surface corresponding in shape to the other side of said pattern, whereby the said compressors are adapted for separate or conjoint use.

8. In an apparatus of the class described, a flask, a pattern therein, means for first automatically distributing sand over said pattern, means for subsequently compressing said sand against one face of the pattern, and means, separate from said distributing and compressing means, for compressing sand against the other face of said pattern, whereby said compressors are adapted for separate or conjoint use.

9. In an apparatus of the class described, a two-part flask, and two separate compressors, one of said compressors being adapted to assist in holding the sand in one of the parts of said flask until the casting operation is completed, and the other of said compressors being also adapted to hold the sand in the other part of said flask during the casting operations.

10. In an apparatus of the class described, a two-part flask, a pattern positioned within said flask, a female compressor serving to compress sand against one side of the pattern and adapted to remain within the flask so as to retain the sand in place until the casting operation is completed, and a male compressor, separate from the female compressor, serving to compress sand against the other side of said pattern, and adapted, also, to remain within the flask so as to retain the sand in place until the casting operation is completed.

11. In an apparatus of the class described, a two-part flask, a pattern, a member within the cope below the upper edge of the side walls thereof and operating to compress sand within the cope and to retain it therein, and a second member adapted to operate separate from said first member, located within the drag and well within the lower edges of the side walls thereof, whereby said second member is adapted to retain sand within the drag until the casting operation is completed.

12. In an apparatus of the class described, a reversible two-part flask, and two separate compressors adapted for separate or conjoint use, one of said compressors coöperating with one of the parts of said flask, and the other compressor coöperating with the other part of the flask.

13. In an apparatus of the class described, the combination of a flask, a pattern, and a rammer or compressor with inclined marginal walls and arranged to enter the flask with said walls inclined at an angle to the sides of the flask, whereby the sand in the flask is displaced laterally and distributed over the pattern preliminary to the compression of the sand between the compressor and the pattern, and reinforcing means coöperating with the reverse side of the pattern to support the same during the compression of the sand.

14. In an apparatus of the class described, the combination of a flask, a pattern, and a rammer or compressor with inclined marginal walls and arranged to enter the flask with said walls inclined at an angle to the sides of the flask, whereby the sand in the flask is displaced laterally and distributed over the pattern preliminary to the compression of the sand between the compressor and the pattern, and reinforcing means coöperating with the reverse side of the pattern to support the same during the compression of the sand, said reinforcing means being separable from the pattern and the flask.

15. In an apparatus of the class described, the combination of a flask, a pattern within said flask, and a hollow rammer or compressor, the external contour of which corresponds to the internal shape of the pattern, said compressor being provided with external ribs or flanges adapted to hold the sand on the withdrawal of the pattern.

16. In an apparatus of the class described, the combination of a flask, a pattern within said flask, and a rammer or compressor, the external contour of which corresponds to the internal shape of the pattern, said compressor being provided with ribs or flanges adapted to hold the sand on the withdrawal of the pattern, and also provided, on its reverse side, with reinforcing ribs which are substantially flush with that part of the rammer which is adapted to bear against a frame or abutment.

17. In an apparatus of the class described, the combination of a flask, a pattern, a rammer or compressor, and means within the flask, to assist in sustaining the pattern against yielding during the molding operation.

18. In an apparatus of the class described, a flask, a hollow pattern, and a supporting frame for the pattern, the exterior contour of said frame being substantially the same as the inner face of the pattern.

19. In an apparatus of the class described, a pattern, and a removable reinforcing frame coöperating therewith to enable said pattern to resist the pressure in ramming.

20. In an apparatus of the class described, a flask, a pattern therein, a compressor adapted to enter the flask and to coöperate with the pattern in molding sand on one side of the latter, and a removable frame coöperating with the other side of the pattern for bracing the same to resist the pressure of the sand and the compressor on said pattern.

21. In an apparatus of the class described, a flask, a pattern therein, a compressor adapted to enter the flask and to coöperate with the pattern in molding sand on one side of the latter, and a reinforcing frame independent of the flask and coöperating with the other side of the pattern and removable from said pattern.

22. In an apparatus of the class described, a flask, a pattern therein, a compressor adapted to enter the flask and to coöperate with the pattern in molding sand on one side of the latter, and a removable reinforcing frame coöperating with the other side of the pattern, the profile of said frame conforming to the internal contour of the pattern.

23. In an apparatus of the class described, a compressor, and a removable gate former coöperating therewith and removable therefrom, whereby said gate former may be replaced by a pouring gate.

24. In an apparatus of the class described, a compressor, a removable gate former coöperating therewith, and a pouring gate adapted to replace said gate former.

25. In an apparatus of the class described, a hollow compressor, and a plurality of gate formers coöperating therewith and removable therefrom, whereby said gate formers may be replaced by pouring gates.

26. In an apparatus of the class described, a compressor, a pouring gate removably fitted thereto, and means for securing said pouring gate to said compressor.

27. In an apparatus of the class described, a compressor having a removable gate former coöperating therewith, a pouring gate adapted to replace said gate former, and means for allowing air and gases to escape through said compressor during the casting operation.

28. In an apparatus of the class described, a hollow frusto-conical compressor, the inclined walls of which are perforated to permit the escape of gases therethrough during the casting operation.

29. In an apparatus of the class described, a compressor and pouring gate coöperating therewith, and means, separate from the pouring gate and compressor, for allowing the escape of gases during the casting operation.

30. In an apparatus of the class described, a two-part flask, a perforated compressor adapted to enter one part of said flask, and a second perforated compressor adapted to enter the other part of said flask, said compressors being adapted to permit the escape of gases therefrom during the casting operation.

In testimony whereof I have signed my name to this specification in the presence of two subscribing witnesses.

PAUL DUPONT.

Witnesses:
 GEORGES BRAUN,
 GUSTAVE LEGROUN.